Patented Apr. 28, 1942

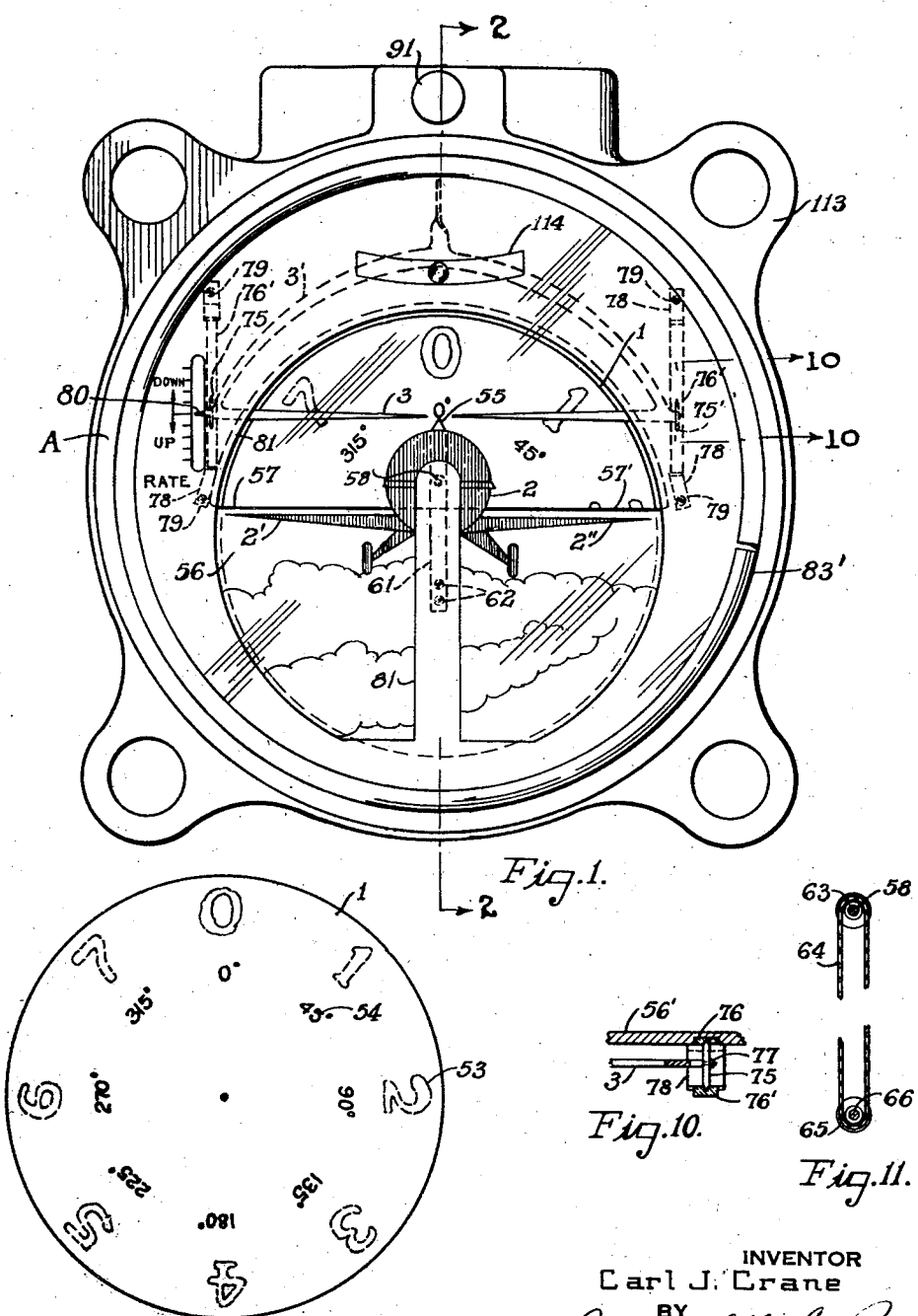

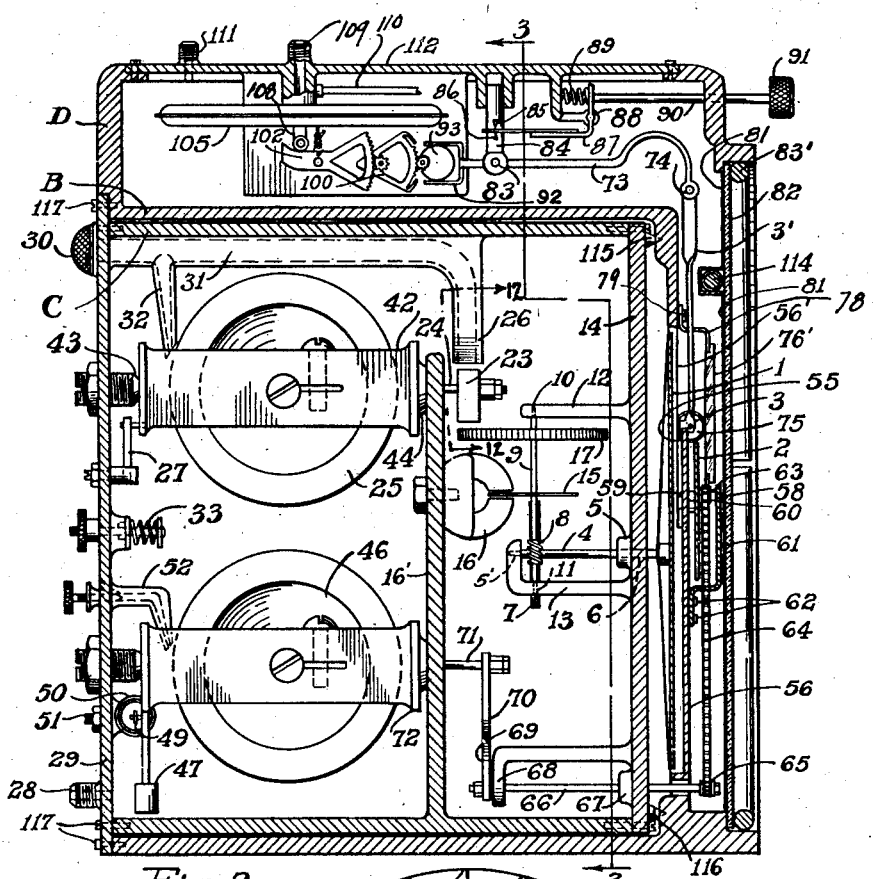

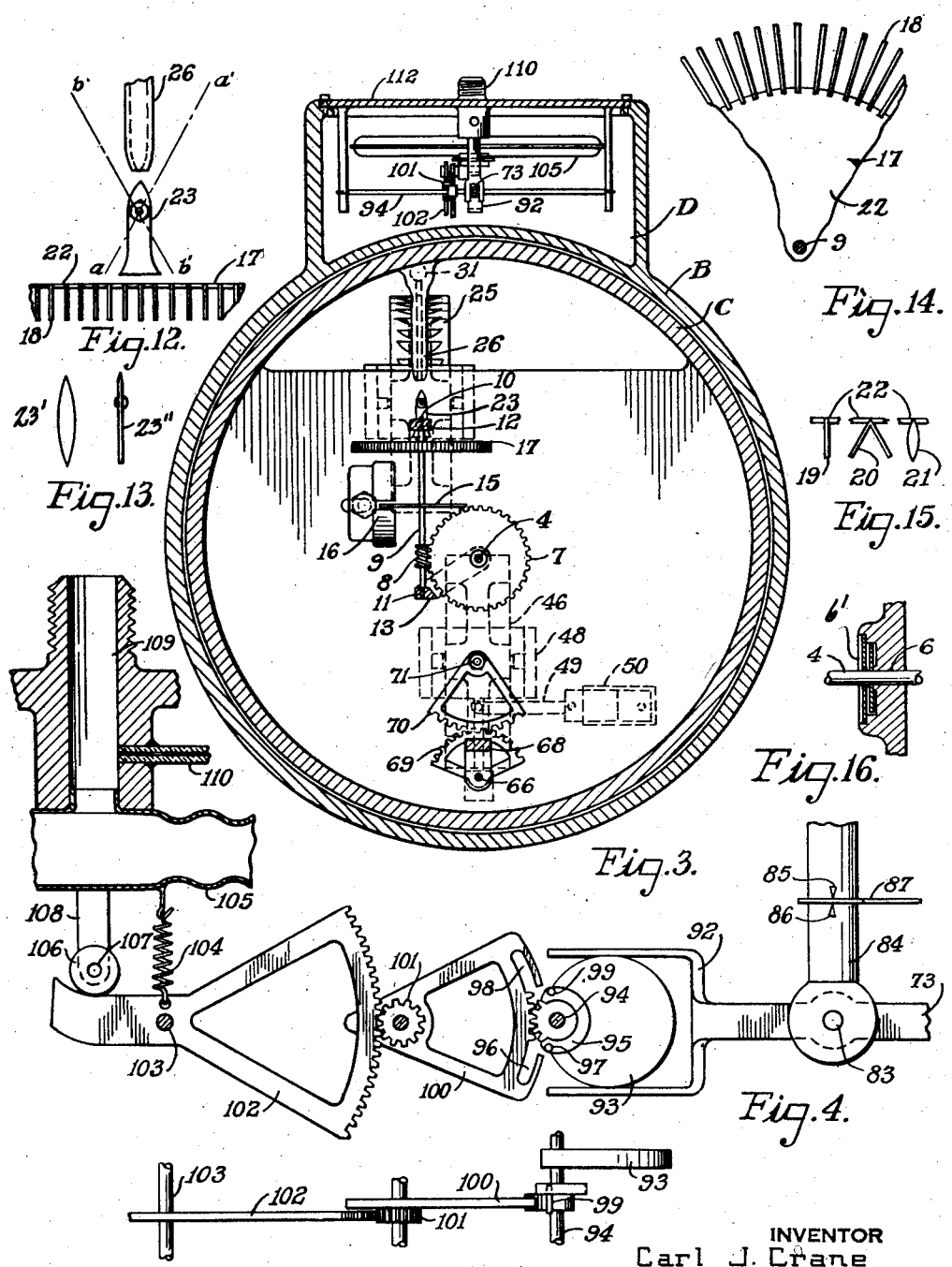

2,280,797

UNITED STATES PATENT OFFICE 2,280,797

AERIAL FLIGHT INSTRUMENT

Carl J. Crane, Montgomery, Ala.

Application March 6, 1935, Serial No. 9,689

8 Claims. (Cl. 33—204)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in instruments to facilitate aerial flight, particularly relating to an integrating device and co-related series of indicia in such unitary arrangements as will enable the proper control and flight of an aircraft by "blind" or "instrument" flying.

Numerous instruments have heretofore been provided as an aid to the pilots of aircraft for the purpose of indicating or seeking to indicate the attitude or changing attitude of the aircraft without external visual reference, that is, terrestrial or astronomical reference. It has been definitely proven by Major William C. Ocker, U. S. Army, that a pilot using present flight instruments will suffer from vertigo in the absence of external terrestrial or astronomical reference, due to movements of the aircraft. A psychological condition is brought about when the aircraft pilot has to read and interpret even a limited number of instruments of the present type. The effect may well be likened to that of a person being subjected to the "third degree"; the necessary self integration which the pilot has to make producing a condition of vertigo, and loss of ability to think clearly and act expeditiously and with safety. This condition has proven to be fundamentally true in even the most perfect of physical specimens. It is therefore a primary object of this invention to provide a unitary instrument wherein is provided a characteristic but artificial field of view that bears relative movement to angular deviations in aircraft flight about various axes, which will convey to the pilot a direction of turn, as well as the intensity and approximate magnitude of turn; stimulating him with a visual factor which will cause an elimination of the condition of vertigo.

It is a further object of this invention to provide a unitary arrangement of instruments for an aircraft pilot which will require but little interpretative effort upon the part of the pilot, and which at the same time will give the pilot all necessary indications for flight control.

It is a further object of this invention to provide a flight integrator which is capable of inhibiting and counteracting the illusion of turn in an opposite direction after turning movements, such as a tail spin or spiral movement of an aircraft after completion, and thus preventing the pilot from erroneously operating the aircraft controls, such as has many times resulted in a fatal second tail spin.

A further object of this invention consists in the provision of an improved gyroscopically controlled aircraft turn indicating unit.

A further object of this invention consists in the provision of an improved air directed turn integrating mechanism.

A further object of this invention consists in the provision of an improved gyroscopically controlled and air directed aircraft turn indicating unit positioned with respect to a pilot's field of view in a co-related arrangement with a bank indicator.

A further object of this invention consists in the provision of an improved gyroscopically controlled and air directed aircraft turn indicating unit positioned with respect to a pilot's field of view in a co-related arrangement with a bank indicator and in a further co-relation with a rise and fall indicator.

It is a further object of this invention to provide an improved aircraft control indicator which will give the pilot a visual stimulus similar to the normal flight stimulus, while flying "blind," as in a fog.

It is a further object of this invention to provide a unitary instrument for flight control based on "integrated rate" control which is not adversely affected by violent maneuvers of the aircraft.

A further object of this invention is to provide an improved instrument adapted for use on aircraft, for the purpose of facilitating blind flight which is an improvement upon instruments set forth in U. S. Patents No. 2,053,182 and No. 2,053,183, respectively, and U. S. Patent No. 1,955,488, the present instrument being in contrast markedly simplified and embodying improved mechanism for turn and climb and glide indication, and suction control within the instrument case.

Other objects and advantages of this invention will be apparent during the course of the following detailed description.

In the accompanying drawings, forming a part of this specification, and wherein similar reference characters designate corresponding parts throughout the several views, Figure 1 is a front view of the instrument, which is demountable as a unit and is adapted to be mounted on the instrument board of any type of aircraft.

Figure 2 is a vertical sectional view taken through the housing of the instrument, on the line 2—2 of Figure 1 and showing certain operating mechanism therein in side elevation.

Figure 3 is a transverse vertical sectional view taken on the line 3—3 of Figure 2.

Figures 4 and 5 are fragmentary sectional side and plan views of the rise and fall indicator actuating mechanism.

Figure 6 is a detail sectional view of the suction relief valve.

Figure 7 is a fragmentary view of one of the gyroscope rotor mountings.

Figure 8 is a vertical sectional view through one of the gyroscope mountings.

Figure 9 is a front elevation of the turn indicating dial.

Figure 10 is a fragmentary detailed view of the rise and fall indicator yoke guide track, taken substantially on the line 10—10 of Figure 1.

Figure 11 is a front view of the bank indicator drive chain.

Figure 12 is a fragmentary view of the impeller and its control vane, the view being taken substantially on the line 12—12 of Figure 2.

Figure 13 shows modified forms of control vanes.

Figure 14 is a fragmentary plan view of the impeller.

Figure 15 shows a series of modified forms of individual impeller blades.

Figure 16 is a detail view of the labyrinth packing.

In the drawings, wherein for the purpose of illustration is shown only a preferred embodiment of the invention, the letter A may designate the improved flight integrator. It includes a primary casing B suitably provided for mounting on the instrument board of the airplane and a secondary casing C fitted into casing B and forming a part of the complete instrument.

The instrument itself is of a cylindrical form except as provided in the flat dome casing D which encloses the rise and fall mechanism and which forms an integral part of the casing B.

The indicating face of the improved flight integrator as shown in Figure 1 combines the various indicia for providing the airplane pilot with information of the turn, bank and climb and glide of the airplane to which the improved flight integrator may be attached. The indicator 1 for turn, the indicator 2 for bank and the indicator 3 for rise or fall are closely associated in the same field of view to provide the pilot with fatigue reducing means of flight control under conditions of blind flight. This close association of indicating indicia in the same field of view also provides the pilot with a substantially identical visual stimulus as is obtained during normal clear weather flight and by means to be described later enables the pilot to inhibit the effects of vertigo which obtain during blind or instrument flight such as in fog.

The indicator 1 for turn is attached and fixed to its shaft 4 which is rotatably mounted in the bearings 5—5' of well known construction (such as friction reducing ball bearings). The bearing housing 6 is also provided with a close fitting labyrinth packing 6' to eliminate air leakage from or to the interior of the casing C, as shown in Figure 16. Attached to and fixed to the shaft 4 is a worm gear 7 which meshes with the worm 8 of the shaft 9. The worm shaft 9 mounted in a vertical manner is supported in pin type antifriction bearings 10 and 11 in such a manner as to allow freedom of rotation in both directions. The bearings 10 and 11 are positioned in the extension arms 12 and 13 which form an integral part of the front cover 14 of the secondary casing C. Fixed to the shaft 9 is a disc 15 preferably constructed of thin gauge aluminum. This disc 15 is substantially circular in plan and rotates with the shaft 9 in such a manner that a portion of it occupies a position, as shown in Figure 2, between the poles of a permanent magnet 16 and spaced slightly therefrom, and in combination therewith forms a magnetic drag type of damper to prevent undesired overspeeding of the shaft 9, and to quickly reduce its speed when the force driving the shaft 9 has been removed. The magnet 16 is adjustably fixed to the gyroscope supporting bulk head 16' extending transversely of the case C. Fixed to the shaft 9 near its upper extremity is an impeller 17 having a body 22 preferably constructed of some light alloy such as magnesium. Disposed radially about the periphery of the impeller 17 are blades 18, constructed of some light material such as magnesium alloy. They may be formed as an integral part of the impeller 17 if desired. The blades may be constructed in thin walled rectangular form 18 or 19, as shown in Figures 14 and 15, or of an inverted V-shape 20, or streamlined as shown at 21 in Figure 15. They may be fastened to or integrally moulded with the impeller body 22.

As will be obvious, the purpose of the impeller 17, in combination with its attached shaft and gearing to the turn indicator 1, in fact forms torque amplifying means for transmitting the degree, speed and direction of rotation to the turn indicating element 1. In essential relation thereto and forming a part of the torque amplifying means is a vane 23 which is fixed to a yoke shaft 24 of the gyroscope 25. The gyroscope 25 together with its codependent bearings, yoke shaft, et cetera, is of the well known type of spring centralized gyroscope of two degrees of freedom. The non-pendulous gyroscope 25 is of well known air spun type of two degrees of freedom rotatably mounted in ball bearings 40 and 41 in the gimbal 42, as shown in Figures 2 and 7. The gimbal is mounted in ball bearings 43 and 44. All these bearings are of an adjustable type in order to secure the proper clearance for reduction of friction and ease of operation. The periphery of the gyroscope is provided with notched hopper recesses 45 for receiving the jet of air, so as to rotate the gyroscope.

Of similar construction is the gyroscope 46, which is one of two degrees of freedom without spring centralizing means, but provided with a pendulum 47 rigidly fixed to the gimbal 72. Attached to the pendulum 47 is a piston rod 49 of a dashpot 50 of well known and conventional construction. A needle valve 51 is provided for the dashpot in order to obtain varying degrees of damping. A needle valve jet 52 supplies air for driving the gyroscope 46 and is integrally formed as a part of the cover plate 29 of the secondary casing C.

The vane 23 is positioned in a normally centralized vertical location beneath a fluid jet 26. The control vane 23 in combination with the air jet 26 and the gyroscope 25 form the torque amplifying means for controlling in cooperative relation with the torque amplifying transmitting means, the degree, speed and direction of rotation of the turn indicating element 1. When no condition of turn of the airplane exists it should be evident that the gyroscope 25 is in a centralized position, as shown, being restrained in this centralized position by a centralizing spring 27 of cantilever leaf construction.

When the airplane to which the instrument is attached effects a turn there is an immediate precession of the gyroscope about its axis, the amount of precession depending upon the rate of turn, and the direction of precession dependent upon the direction of turn. In the present embodiment the gyroscope rotates in the direction indicated and therefore for a right turn the induced precession will be such as to cause the axis of the vane 23 to be displaced in a direction of the line bb' of Figure 12. The air which is constantly flowing from the jet 26 over the vane 23 will be deflected by an angular setting of the vane and effect rotation of the impeller 17 in a direction and at a rate substantially proportional to the direction and rate of turn of the aircraft. Since this turn, however small, requires time to complete, the total angular rotation of the impeller and its connected indicator for turn, in degrees, is substantially proportional to the degree of turn of the airplane. It is this inherent quality of the torque amplifying mechanism that in fact reduces the whole to an integrator of turn.

It should be apparent that the control vane 23 may assume a plurality of angular settings between stops and between the position lines aa' and bb' of Figure 12 as indicative thereof. For each of these angular settings there is a definite characteristic air flow from the jet 26 over the vane 23, and onto the impeller 17 which is productive of special and definite rates of turn of the impeller and connecting linkages. If desired, other forms of vanes 23' and 23'', shown in Figure 13 may be used in lieu of the vane 23.

The air impinging on the impeller 17 and for driving the rotors of the gyroscope, is drawn into the secondary casing by means of suction pump or Venturi tube of any satisfactory design. The source of suction is connected to a fitting 28 which is integrally formed with the rear cover 29 of the secondary casing C. To replace the air withdrawn from the secondary casing air enters the casing through a screened inlet 30 thence passing through a channel 31 which forms an integrally moulded portion of the secondary casing. From this air duct or channel 31 another jet 32 supplies air to the gyroscope rotor wheel 25. It should be apparent that since the volume of air and pressure thereof passing over the impeller and driving the gyroscope rotor must be mutually related in quantity to control the related speed of the gyroscope and the speed of the impeller, it is important that the air jets 32 and 26 be closely associated as shown. Again since the volume of air and pressure thereof passing through the channel 31 must remain substantially constant, a pressure relief valve 33 is mounted in the back cover 29 of the secondary casing C to maintain at all times a substantially constant suction in the casing. This pressure relief valve, also shown in Figure 6, consists essentially of a spring loaded washer 34 of fibre or other similar material, forming a closure to the recessed cut 35 which is open to atmospheric pressure. The threaded pin 36 with head 37 serves as an adjustable keeper for the spring 38. The knob or nut 39 is used to vary the tension in the spring 38, thereby controlling the suction within the casing. Increasing the spring tension serves to be productive of a higher vacuum within the casing, while lower spring tension produces the opposite effect.

It should now be obvious that if under operating conditions, the present improved instrument be subjected to turning movements such as when properly installed in an airplane during flight, a clockwise motion of the indicator 1 for turn will result during left turns, visually producing in the correlated field of view with the bank indicator 2 an apparent turn to the left as is normally seen by the pilot of the airplane during normal flight. The opposite obtains for a right turn wherein the indicator for turn rotates counterclockwise visually producing in the correlated field of view with miniature airplane banking indicator an apparent turn to the right, since the detail markings engraved on the turn indicator have now a relative motion past the "nose" of the miniature airplane index from right to left. The detail markings 53 on the turn dial represent a simulated cloud effect portrayed in numerals which divide the turn indicating face into a number of equal divisions, while the detail markings 54 represent substantially the number of degrees of turn actually swept through during a turn, such markings being the equivalent of those found on the conventional compass card. The index 55 serves as a "lubber's line" for reading off the degree markings. The index 55 is in fact a pointer formed by an upward extending portion of the semi-circular disc portion 56 of a false wall or bulk head 56'. This wall 56' is an integral portion of the primary case B. The portion 56 masks the lower portion of the turn indicating disc from the pilot's field of view. The upper edge 57—57' of the masking portion 56 is preferably straight, as shown in Figure 1, and that portion of it visible to the pilot has delineated thereon characteristic markings representative of a cloud field as viewed from the air.

Closely associated in the same field of view with the turn indicator disc 1 is the indicator for bank or banking index 2, positioned in front of the upper portion of the turn indicator disc. It is mounted on a shaft 58 running in bearings 59 and 60, the former set in the bulkhead 56, by means of studs 62. The banking index 2 is capable of rotation on its shaft 58 both clockwise and counter-clockwise to a substantial amount of 90 degrees in either direction. Attached to the shaft 58 of the banking indicator and forming an integral part thereof is a sprocket 63 which engages a chain 64 of endless conformity which in turn engages a sprocket 65 of a shaft 66. The shaft 66 is rotatably mounted in bearings 67 and 68 of conventional nature, the latter being provided with labyrinth packing, similar to that shown in Figure 16, to prevent the influx of air into the secondary casing at the location of said bearing. Attached to the rearward extension of the shaft 66 is a gear segment 69, the teeth of which engage the teeth of a gear segment 70, the latter segment being fixed to and mounted upon a shaft 71 extending forwardly from and connected to the gyroscope gimbal 72. The gyroscope 46 with its bearing et cetera, is similar in construction to the gyroscope 25 with such exceptions as above described. It should be apparent that any rotation of the gimbal shaft 71 imparts, thru the linkages just described, a rotation of the shaft 58 of the banking indicator 2, but, as is quite evident in a counter-direction. Therefore, if the case of the instrument is banked or tilted to the left without accompanying turn in that direction, the pendulum 47 will effect a clockwise rotation of the gyroscope gimbal 72 in relation to the instrument casing. This displacement results in a counterclockwise rotation of the shaft 58 of the banking indicator 2, producing in fact a depressing of the left wing 2' of the index to indicate a tilt to the left or a condition of left bank. The reverse action holds for a tilt to the right as in a right side slip and is productive of an indication of right bank. Since a right or left bank or tilt unaccompanied by turn does not produce precession in the gyroscope, the latter in no manner affects the indication just described. However, should a banked turn be executed the case of the instrument and therefore the pendulum 47, is subject to the resultant of the force of gravity and centrifugal force. Therefore, the pendulum 47 would assume the "apparent vertical" and there would be no causative force to cause rotation of the gimbal 72 and its mechanically related structure and consequently no indication of bank. The precession of the gyroscope 46 however, prevents the pendulum 47 assuming the "apparent vertical" during a banked turn so that there is in fact a rotation of the gimbal 72 which is transmitted thru the mechanism and productive of an indication of bank while turning in degree substantial to that actually obtained by the airplane to which the instrument is attached.

It should be apparent that while the gyroscope 25 which through improved means actuates the turn indicating disc is undamped and non-pendulous, the gyroscope 46 is damped and is pendulous, making the latter sensitive to the effects of gravitational force, centrifugal force or combinations thereof, as well as to turning motions or various combinations of all three, thereby producing in the indicator for bank substantially precise indications representative of the actual deviations of the airplane to which attached about its longitudinal axis.

Closely associated in the same field of view with the banking indicator 2 and the turning indicator 1, is the indicator for rise or fall 3 hereinafter referred to as the horizon bar. In the present improved instrument for flight integration, the horizon bar is preferably positioned in front of the turn indicating disc and its plane of vertical travel substantially parallel to but to the rear of the plane of the banking indicator 2. The horizon bar 3 is provided, as will be seen, with mechanism to cause the bar to rise when the airplane to which the present improved instrument is attached, is losing altitude. A rise of the airplane will cause a fall of the horizon bar. The change either upwardly or downwardly of the horizon bar from its neutral position as shown in Figure 1, is an indication, respectively, of fall and rise of the airplane. In ordinary clear weather flight this impression, or visual stimulus is substantially identical with that received by an airplane pilot when the nose of the airplane appears above the true horizon during climb or gain in altitude and below it during glide or loss of altitude. The horizon bar, both visible portion 3 and hidden portion 3', is preferably constructed of some light material such as magnesium alloy. It has an arc shaped body with its lower opposite ends provided with pointer like bars extending toward each other. They are substantially parallel to the lateral axis of the instrument, in the same plane and spaced at their proximate ends. The arc shaped body of the horizon bar 3 is centrally pivoted to the rocker arm 73 by a pin 74, as shown in Figure 2. To constrain the movement of the horizon bar to substantially vertical travel, the lower right and left extremities of the horizon bar are provided with wafer rollers 75 and 75' constructed of thin steel, running in grooved tracks 76 and 76'; the latter preferably being constructed of tempered glass to reduce friction. The wafer rollers are rotatably mounted on the extremities of the horizon bar on pin type bearings 77, as shown in Figure 10. The rear grooved tracks are countersunk into the bulkhead 56 and cemented thereto, while the forward tracks 76' are mounted in brackets 78, which in turn are suitably fastened to the bulkhead 56' by means of screws 79. It is apparent from the foregoing that the horizon bar suspended at the pivot 74 is constrained to movement in substantially a vertical plane. Extending slightly to the left near the lower left wafer roller 75, a portion of the horizon bar forms an index 80 which in fact is an indicator for reading off the indicated rate of climb from a scale suitably delineated on the mask 81 formed of paper or the like and secured to the rear of the bezel glass closure 82 of the primary case. The bezel glass closure 82 which in fact forms an air tight transparent closure for the front of the primary case is held securely in place by the snap ring 83'.

The rocker arm 73 is pivoted on a pin 83 and together with the suspended horizon bar is statically balanced about the fulcrum 83, in order that the system will not be adversely affected by the accelerations accompanying flights through rough air. A fulcrum post 84 is provided with knife edges 85 and 86, forming a supporting point for the fulcrum post by receiving therebetween a portion of a bi-metallic temperature compensated adjustment bar 87. The latter of articulated formation is supported by a pin bearing 88. The upwardly extending portion of the adjustment bar 87 is positioned between a spring 89 to the rear, and a pin 90 to the front. The pin 90 is threaded where it passes thru the primary casing D and is provided with a knurled knob 91, by means of which the locus of the fulcrum 83 may be changed. This will alter the neutral position of the horizon bar. It is well known that instruments which include pressure operated cellular elements, as is true in the present preferred embodiment, are subject to slight errors due to lag or hysteresis of said elements. The setting knob 91 is therefore provided to re-set the horizon bar should an error become apparent.

A forked end 92 of the rocker arm 73 slidably engages a cam or eccentric 93 which is rotatably mounted on a shaft 94. The eccentric 93 is limited in rotation to 90 degrees in either direction from the neutral position shown in Figure 4. Attached to the eccentric and fixed thereto is a pinion 95 that is capable likewise of a total rotation of 180 degrees. Clockwise rotation of the eccentric and its attached pinion is stopped when the cammed slot 96 (shown in Figure 4) engages the pin 97 while counterclockwise rotation is stopped when the cammed slot 98 engages the pin 99, in spite of additional rotation of an eccentric drive sector 100. The eccentric drive sector has a pinion 101 keyed therewith which engages the teeth of the power sector 102, the latter being rotatably mounted on a shaft 103, and spring constrained to a neutral position (shown in Figure 4) by the coil spring 104. Rotation of the power sector is the result of expansion or contraction of the diaphragm cell 105 and its connecting tappet 106; the latter being of roller type in the preferred embodiment and rotatably mounted on a pivot 107 in the diaphragm stud 108. The latter forms an integral part of the diaphragm 105 as by being welded or soldered thereto. The diaphragm together with its threaded hollow outlet 109 and the capillary leak tube 110 form an assembly well known as the capillary leak type of statascope.

As can be seen if the airplane to which the improved flight integrator is attached effects a climb, the reduced atmospheric pressure encountered will first be effective on the exterior of the diaphragm since time is required for sufficient air to escape through the capillary tube 110. Should this climb be constant there will be a continuous escape of air through the capillary tube 110, as air friction in the tube prevents instantaneous equalization of pressure between the interior and exterior of the diaphragm. This very inequality of pressure will produce an expansion of the diaphragm and, through the leakage described above, a lowering of the horizon bar 3 to indicate a climb of constant value. The reverse is true for a loss of pressure altitude which is accompanied by a collapsing of the diaphragm with attendant rise of the horizon bar to indicate a glide. It should be pointed out here that for optimum results the threaded connection 109 should be connected to a separate capacity in the form of a thermally sealed tank of air under atmospheric pressure in the manner shown in Patent No. 1,929,091 to C. H. Colvin, dated October 3, 1933. Likewise for optimum results the threaded connection 111 should be connected to a static air pressure line located in the airflow about the airplane.

The diaphragm together with its connecting linkages exclusive of the horizon bar 3, is mounted for support to the cover 112 of the dome casing D which forms an airtight closure for this the upper part of the primary casing. The cover 112 is recessed and fixed into the dome casing D being fastened thereto by means of machine screws or the like.

It should now be apparent that the primary casing in combination with its integrally moulded casing incloses the mechanisms for rise and fall together with the banking indicator. It also forms the base shell for the mounting of the instrument to the instrument panel by means of the lugs 113. The front bezel glass closure 82 with its attached mask 81 also provides a mount for the steel ball in glass tube inclinometer 114 of well known design and construction, the latter unit being cemented to the inner surface of the bezel glass for visible reference by the pilot.

The secondary casing C together with its front cover 14 and rear cover 29, constitutes a unitary element which may be withdrawn intact from the primary casing B after disconnecting the chain 64 from the pulley 65. This secondary casing is provided with dowels 115 and 116 (see Figure 2) which accurately position the front of the casing within the primary casing to provide accurate register. Screws 117 fasten the rear cover of the secondary casing to the shell of the primary casing combining the whole into one unified and compact instrument in the preferred embodiment.

It should now be apparent that there is grouped in closely associated field of view, and normally related apportionment, indicia of turn, bank, and climb or glide in such manner as to provide, by visual reference thereof, an efficient designation of aircraft operation, based on vertigo and fatigue reducing factors, as has been heretofore elucidated in the above identified patents; the present improved and preferred arrangement embodying a very material simplification of mechanism and increase in reliability of operation.

Various changes in the shape, size, and arrangement of parts may be made to the form of invention herein shown and described, without departing from the spirit of the invention or the scope of the claims.

I claim:

1. An aircraft flight instrument comprising a rotatable turn indicating disc, pneumatic means for driving said disc in designation of degree of turn, and means comprising an element simulating the horizon and a second element simulating an aircraft, said elements being cooperatively disposed in the same field of view as said disc and being operable in response to the rise and fall of an aircraft and to banking of the aircraft respectively whereby relative movement of said elements with respect to said disc and rotation of said disc indicates conditions of turn and bank and rise and fall of the supporting aircraft.

2. In a flight instrument the combination of an indicating member, an air driven reversible turbine for operating said member, means responsive to rate of turn of an aircraft for actuating the air drive of the turbine to integrate the rate of turn with respect to time whereby the member will indicate the amount of turn of the craft upon which the instrument is supported, said indicating member being in the form of a rotary disc having suitable indicia thereon in designation of angular degree of turn.

3. In an aircraft flight instrument the combination of a housing having a masked face provided with a semi-circular opening having a horizontal edge forming a horizon reference member, a turn indicating disc rotatably supported in the casing behind and at substantially the pivot point of the radius generating said semi-circular opening whereby a segment thereof will rotate in visual relation with said opening, means for actuating said disc responsive to turn of an aircraft, said disc having indicia thereon designating the degree of turn, a banking member movably supported by the casing in correlated view with said turn indicating disc whereby the disc and the horizon reference member form a background for said banking member, and means supported by the casing for actuating said bank indicator responsive to the banking of an aircraft.

4. In an aircraft flight instrument the combination of a housing having a masked face provided with a substantially semi-circular opening having a horizontal edge forming a horizon reference member, a turn indicating disc rotatably supported in the casing behind and at substantially the pivot point of the radius generating said semi-circular opening whereby a segment thereof will rotate in visual relation with said opening, means for actuating said disc responsive to turn of an aircraft, said disc having indicia thereon designating the degree of turn, a banking member movably supported by the casing in correlated view with said turn indicating disc whereby the disc and the horizon reference member form a background for said banking member, means supported by the casing for actuating said bank indicator responsive to the banking of an aircraft, and rise and fall indicating means including an indicator movable upward and downward across the semi-circular opening of said face in correlated field of view with said turn and bank indicators, whereby the relative positions and movement of said three indicating elements provides a unitary indication simulating the exact attitude of an aircraft upon which the instrument is mounted.

5. In a flight indicator for aircraft the combination of a rotatable disc-like element positioned in a vertical plane and rotatable about a horizontal axis, means responsive to turning of the aircraft for rotating said disc counter-clockwise for a right turn and clockwise for a left turn, a horizontally disposed element simulating the horizon line and movable upward and downward across the face of said disc-like element, means for actuating said horizon simulating element whereby said element moves downward for an upward movement of the aircraft and upward for a downward movement of the aircraft, an indicating element simulating an aircraft having its wings normally parallel to said horizon simulating element and adapted to move angularly about a horizontal axis parallel to the axis of the disc-like element, and means responsive to banking of the craft for actuating said aircraft simulating element so that its position with respect to the horizon simulating element corresponds exactly to the bank of the aircraft, said disc-like element, said horizon simulating element and said aircraft simulating element providing by their conjoint movement a unitary indication portraying the exact attitude and movement of the aircraft.

6. In a flight indicator, the combination of a turn indicator comprising a rotatable disc-like member positioned in a vertical plane and rotatable about a horizontal axis, an air-spun gyroscope for controlling the actuation of said turn indicator, a bank indicator comprising an indicating element simulating an aircraft and positioned in front of said disc-like element whereby the latter forms a background therefor, said aircraft-simulating element being movable with respect to said disc-like element to indicate left and right bank, means for actuating the bank indicator, a rise and fall indicator comprising an indicating element simulating the horizon and arranged normally parallel to said aircraft-simulating element and adapted to move upward and downward whereby its relative movement with respect to the aircraft-simulating element corresponds to upward and downward movements of the aircraft on which the flight indicator is mounted, and means for actuating said rise and fall indicator, the turn indicator, bank indicator, and rise and fall indicator providing a unitary indication and being arranged in such a manner that upon a counter-clockwise rotation of said disc-like element the position of the aircraft-simulating element with respect thereto gives an indication of a right turn and vice versa, all of said indicator elements being operable simultaneously when the aircraft upon which the flight indicator is mounted turns, banks and rises or falls, whereby the relative positions and movements of the three indicator elements with respect to each other are such that the aircraft-simulating element indicates the attitude and movement of the aircraft on which the flight indicator is mounted.

7. A directional indicator for aircraft showing the direction and amount of deviation from course, comprising a constrained gyroscope mounted for precession through an angle proportional to the rate of turn of the craft, a fluid driven indicator, and fluid actuated means controlled by the precessional position of said gyroscope for turning said indicator at a rate and direction proportional to the extent of precession of said gyroscope, whereby said indicator shows the amount of course change.

8. A directional indicator for aircraft showing the direction and amount of deviation from course, comprising a constrained gyroscope mounted for precession through an angle proportional to the rate of turn of the craft, an air turbine, air flow means adapted to drive the same in either direction at variable rates, and means turned by the precession of said gyroscope governing said flow means to drive said turbine at a rate and direction proportional to the extent of precession thereof, and an indicator actuated by said turbine.

CARL J. CRANE.